(12) United States Patent
Forster

(10) Patent No.: US 9,557,200 B2
(45) Date of Patent: Jan. 31, 2017

(54) DISPOSABLE FLOW TUBE

(71) Applicant: Titan Enterprises Ltd., Sherborne, Dorset (GB)

(72) Inventor: Trevor Forster, Sherborne (GB)

(73) Assignee: Titan Enterprises LTD, Sherborne, Dorset (GB)

( * ) Notice: Subject to any disclaimer, the term of this patent is extended or adjusted under 35 U.S.C. 154(b) by 12 days.

(21) Appl. No.: 14/416,896

(22) PCT Filed: Jul. 23, 2013

(86) PCT No.: PCT/EP2013/065557
§ 371 (c)(1),
(2) Date: Jan. 23, 2015

(87) PCT Pub. No.: WO2014/016316
PCT Pub. Date: Jan. 30, 2014

(65) Prior Publication Data
US 2015/0211904 A1    Jul. 30, 2015

(30) Foreign Application Priority Data
Jul. 24, 2012   (GB) .................................. 1213116.5

(51) Int. Cl.
*G01F 1/66*    (2006.01)

(52) U.S. Cl.
CPC ............... *G01F 1/662* (2013.01); *G01F 1/667* (2013.01)

(58) Field of Classification Search
CPC ........................................................ G01F 1/66
USPC .......................................... 73/861.27–861.28
See application file for complete search history.

(56) References Cited

U.S. PATENT DOCUMENTS

| 5,179,862 A | 1/1993 | Lynnworth |
| 5,463,906 A | 11/1995 | Spani et al. |
| 6,055,868 A * | 5/2000 | Koyano ................. G01F 1/667 |
| | | 73/861.28 |
| 8,714,030 B1 * | 5/2014 | Liu ......................... G01F 1/662 |
| | | 73/861.28 |
| 2008/0236297 A1 | 10/2008 | Fleet et al. |

FOREIGN PATENT DOCUMENTS

| DE | 4409589 | 4/1995 |
| DE | 10 2008 055167 | 7/2010 |

OTHER PUBLICATIONS

Great Britain search report dated Nov. 23, 2012 of GB1213116.5 filed Jul. 24, 2012.
International search report dated Nov. 28, 2013 of PCT/EP2013/065557 filed Jul. 23, 2013.

* cited by examiner

*Primary Examiner* — Jewel V Thompson
(74) *Attorney, Agent, or Firm* — McDonnell Boehnen Hulbert & Berghoff LLP

(57) ABSTRACT

A transit time differential acoustic flowmeter having acoustic transducers which are acoustically coupled to the fluid flowing in a flow tube through the wall of the flow tube itself, in which the flow tube is demountable from the flowmeter and can be disconnected from the external circuit delivering and carrying away the fluid the flow of which is to be detected.

21 Claims, 4 Drawing Sheets

DISPOSABLE FLOW TUBE

CROSS-REFERENCE TO RELATED APPLICATIONS

This application is a National Stage application of co-pending PCT application PCT/EP2013/065557 filed 23 Jul. 2013, which claims the benefit of GB application number 1213116.5 filed 24 Jul. 2012. These applications are incorporated herein by reference in their entireties.

FIELD OF THE INVENTION

The present invention relates generally to acoustic flowmeters, and particularly (but not exclusively) to an acoustic flowmeter which is particularly suitable for use in medical and therapeutic environments.

BACKGROUND

Various types of acoustic flowmeters are known, one of the most versatile being an ultrasonic flowmeter of the transmission, or contra-propagating transit-time differential type. These may be formed in a variety of structural or mechanical arrangements, but all have the common feature that sonic energy, usually at ultrasonic frequencies, is transmitted through a fluid and received by a detector. Both direct transmission and reflective flow sensors are known. A transit-time differential flowmeter functions by determining the difference between the rate of propagation of the sound energy when flowing with and against the stream of fluid the flow rate of which is being determined. This is achieved by assessing the difference between the propagation time with and against the fluid flow, the technique has been used for some time. It has the advantage that besides being reliable and accurate, it can also be used to determine the velocity of sound in the fluid flowing in the flow tubes which, if appropriate, can be used to establish what fluid is present since the velocity of sound is different in different fluids. Industrial processes where the fluid may be changed from time to time benefit particularly from this feature. Although industrial applications are numerous, and transit time differential flowmeters have been used for a wide range of conditions from high temperatures to very low (cryogenic) temperatures and over a wide range of pressures, these usually involve a system in which the sound is transmitted at an angle across the flow tube from one side to the other.

Although it is common for the acoustic energy to be transmitted into the flow of the fluid being measured at an angle to the direction of travel of the fluid, and many flowmeters operate in this way, there are particular advantages in creating a substantially plane wavefront travelling substantially parallel to the direction of fluid flow. The most consistent and accurate results are achieved with a plane wavefront, and for this purpose one known such flowmeter has transducers at each end of a flow tube and inlet and outlet connectors for the fluid into the sides of the flow tube.

However, in order to generate a plane wavefront the wavelength must be greater than the diameter of the flow tube, which means that there is a limit to the upper frequency which can be used with any one flow tube diameter.

The use of acoustic flowmeters is becoming increasingly adopted in therapeutic and medical applications where measurement of the rate of flow of body fluids, especially blood, is of importance. The quantity of fluid flowing, and the flow rates, however, are rather small and it would be convenient to be able to use a small bore flow tube for such purposes.

Typically, the smallest useful diameter for a flow tube of a conventional known flowmeter is in the region of 6 mm, whereas a flow tube having a diameter of 1 mm would be more appropriate for the conditions met in medical applications. This, however, is difficult to achieve, partly because of the difficulty in coupling the acoustic signal in to a fluid having such small transverse dimension at the frequencies of energisation of the transducer which must be used, and partly because such small tubes are difficult to clean, whereas absolute cleanliness, even sterility, is an essential requirement in medical situations.

As in known, the velocity of sound is different in different fluids, and the fact that the frequency of the sound signal is related to the velocity of sound as well as to the flow rate of fluid, means that very small transit time differentials are experienced if the flow rate is relatively low and the velocity of sound in the fluid is relatively high.

SUMMARY

The present invention seeks to provide a flowmeter in which these conflicting requirements can be met, in particular by providing, according to one aspect of the invention, a transit time differential acoustic flowmeter having acoustic transducers which are acoustically coupled to the fluid flowing in a flow tube through the wall of the flow tube itself, in which the flow tube is demountable from the flowmeter and can be disconnected from the external circuit delivering and carrying away the fluid the flow of which is to be detected.

In this way the flow tube itself, which may become contaminated with the flowing fluid during use, may be made economically as a simple disposable component, which allows it to be dispensed with after use and avoids the need for expensive, complex, and possibly somewhat unreliable, cleaning and sterilising techniques.

This can be achieved because of the realisation that by choosing the right frequency range in relation to the diameter of the flow tube and the fluid flowing in it, reliable and consistent results can be achieved over a wide range of flow rates, and which is independent of the Reynolds number of the flow, that is regardless of whether the fluid flow in the flow tube is laminar or turbulent, even when the acoustic coupling is achieved using transducers acoustically coupled to the side wall of the flow tube.

In the acoustic flowmeter according the present invention it is preferred that the acoustic impedance of the flow measurement section of the flow tube is significantly higher than that of the liquid being monitored. This may be achieved, for example, by using a material such as stainless steel, although other materials may be used, in particular a composite material or one sandwiched with metal, especially stainless steel, as the inner layer in contact with the fluid in the flow tube.

The acoustic coupling between the flow tube and the acoustic transducers may be achieved by releasably mounting the acoustic transducers on to the flow tube or to acoustic coupling means with which the flow tube may be provided.

Alternatively, however, the acoustic transducers may be fixedly mounted to the acoustic coupling means and these be releasable from the body of the flowmeter. This is still an economic embodiment, although there is some additional costs associated with the fact that the calibration of a flowmeter having a flow tube which is not in contact with its acoustic transducers upon manufacture (at which time the flow tube itself would be calibrated) involves a more careful and possibly more complex calibration technique.

Regardless of whether the acoustic coupler is mounted on the flow tube or the transducer with the correct choice of frequency the ultrasonic wave front transmitted within the flowing fluid may be an approximately plane wavefront travelling at least substantially parallel to the length of the flow tube. This is preferred by not essential.

The form of the transducers in such a flowmeter has to be chosen carefully. It has been found, however, that, surprisingly, transducers having a parallelepiped shape with a substantially flat face in contact with a correspondingly flat face of the said acoustic coupling means, are capable of generating an acoustic signal with an approximately plane wavefront in a narrow flow tube, at least in the vicinity of the receiving transducer, and that providing a suitable frequency is chosen a substantially planar wavefront travelling along the length of the flow tube can be generated by appropriate stimulation of an acoustic transducer propagating laterally into the flow tube. The spacing between the two transducers which, in a preferred embodiment, act alternately as transmitters and receivers in a time-shift multiplex mode of operation, is also important. A parallelepiped acoustic transducer may be stimulated to resonate in one of three modes, namely lengthwise (length mode), transversely in the direction of the width of the transducer (width mode) or within the thickness of the material (thickness mode). By making the dimensions of the parallelepiped sufficiently different from one another the resonant frequencies at which these three modes of oscillation can be stimulated may be chosen such that the acoustic energy transmitted into the flowing fluid is suitable for use with different ranges of flow rate, thereby making a single flowmeter capable of determining a wider range of flow rates than might otherwise be the case if only a single mode of oscillation were available.

In an alternative embodiment the transducers may have a concavely curved face in contact with the acoustic coupling means. Such transducers may have an arcuate shape and the driving circuitry may be connected to the or each such transducer in such a way as to stimulate its oscillation in a radial mode. Thickness mode oscillation is also available although, with an arcuate configuration the length mode is usually not practicable.

In order to achieve satisfactory operation the frequency of the acoustic wave generated upon energisation of the driving circuit is determined in relation to the dimensions of the flow tube in such a way that, in use, a substantially planar acoustic wave is propagated through the fluid along the length of the tube. Although this may not be a strictly axisymmetric wave front, the off-axis components of the wave are sufficiently attenuated during transmission along the length of the flow tube between the transmitting and receiving transducer that a sufficient signal-to-noise ratio is achieved, and thus a reliable transit-time determination of the flow rate may be made.

The flow tube may be substantially straight along its entire length between the acoustic coupling means, but this is not essential and curved flow tubes may be utilised if the circumstances require it. Preferably, however, there are no singularities in the connections of the flow tube to the external circuit, or between the acoustic coupling means and the flow tube which might cause a disruption in the fluid flow. For this reason the flow tube preferably has a constant transverse dimension along its length between the acoustic coupling means, although the transverse dimension of the tube at or to either side of the region between the acoustic coupling means may be different from that of the portion of the flow tube between the acoustic coupling means.

A convenient shape for the flow tube is one with a circular cross-section along its length.

It is important to get good acoustic coupling between the transducers and the fluid, avoiding any air gaps which degrade the signals. For this the reason acoustic coupling means and the acoustic transducers, or the flow tube and the acoustic coupling means, are preferably held in contact with one another by connection means operable to apply a mechanical force to the interface between the transducer and the coupling means or the coupling means and the flow tube. In the case of a parallelepiped transducer such interface will be substantially flat.

Preferably, a single driving circuit is connected to both transducers and is arranged to deliver energising signals thereto and, likewise, a single detection circuit is preferably connected to both transducers and is operable to process electrical signals generated by both transducers. This may be done in a time-shift multiplex mode, or may be done simultaneously. In this way, it is possible to determine the phase shift or time difference upon transit upstream and downstream.

As mentioned above, in embodiments of the invention in which the flow tube itself is separable from the transducers, either directly or through the acoustic coupling means, it is necessary to ensure that accurate calibration of the assembled instrument is effected once the flow tube has been mounted in position. Although, upon manufacture, a preliminary calibration of the flow tube may be made, the precise separation of the transducers on any one transducer body cannot be determined in advance and accordingly a subsequent recalibration (or initial calibration if a preliminary calibration has not been undertaken) is necessary to establish the parameters of the flowmeter prior to use.

BRIEF DESCRIPTION OF THE DRAWINGS

Various embodiments of the present invention will now be more particularly described, by way of example, with reference to the accompanying drawings, in which.

DETAILED DESCRIPTION

Figure 1:
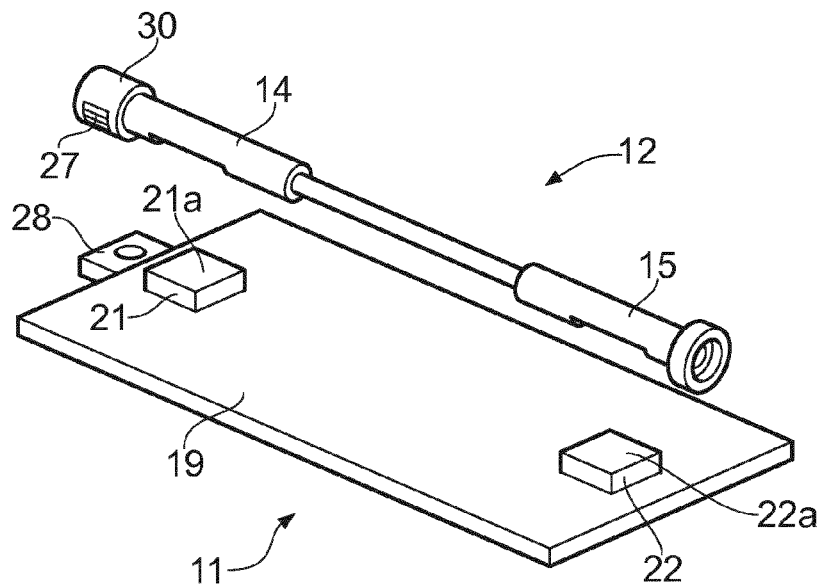
FIG. 1 is a schematic perspective view of the major components of a first embodiment of the invention shown partially assembled.
Figure 2:
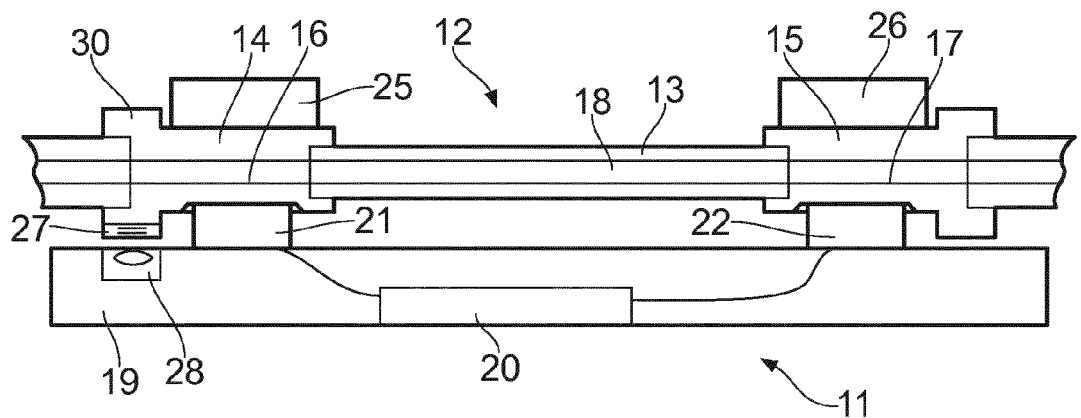
FIG. 2 is an axial sectional view through an assembled flowmeter as in the embodiment of FIG. 1.
Figure 3:
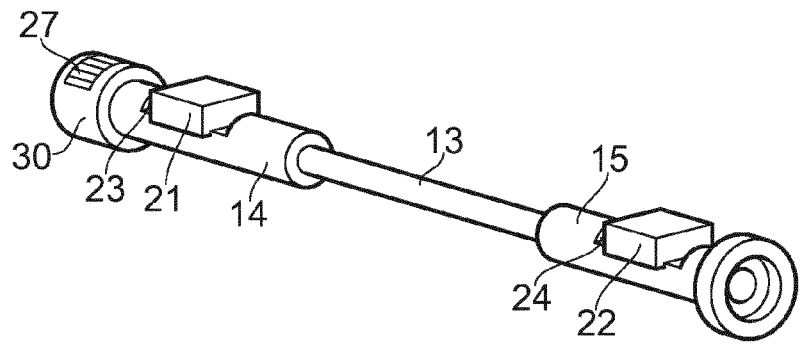
FIG. 3 is a schematic perspective view of an inverted flow tube of the embodiment of FIGS. 1 and 2, showing how the transducers engage the acoustic coupling means.

Referring now to the drawings, and particularly to FIGS. 1, 2 and 3 thereof, there is shown a flowmeter generally indicated 11 having a flow tube generally indicated 12 which comprises a stainless steel tube forming a central section 13 having respective acoustic couplers 14, 15 at each end. The acoustic couplers 14, 15 are substantially identical polymer mouldings which are connected to the ends of the stainless steel tube 13 and have an internal passage 16, 17 respectively (see FIG. 2) which is of the same internal diameter as the internal bore 18 within the stainless steel tube 13 so that fluid flowing therethrough experiences no discontinuities or disturbances in the flow path, thereby avoiding (as far as this is possible) the introduction of turbulence into the stream.

Figure 7:
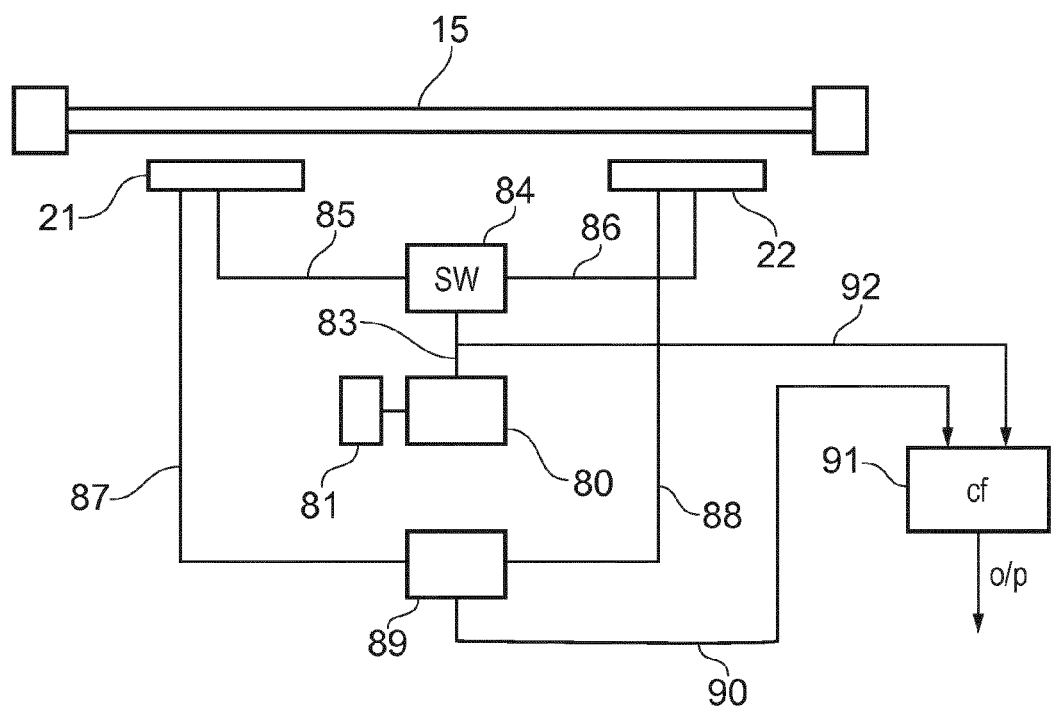
FIG. 7 is a schematic circuit diagram illustrating the functioning of the flowmeter of the invention.

The flowmeter 11 has a body 19 incorporating the control circuitry generally indicated 20 in FIG. 2 and shown in more detail in FIG. 7. Two piezoelectric transducers 21, 22 are mounted on the body 19 of the flowmeter 11, and are held in contact with respective acoustic couplers 14, 15. As can be seen particularly in FIGS. 1 and 3 each acoustic coupler 14, 15 is generally cylindrical and has a flat-faced recess or cavity 23, 24 respectively in its curved surface, the flat face of the recess or cavity lying on a chord of the circular profile of the coupler. Each piezoelectric acoustic transducer 21, 22 is a generally parallelpiped shape with a flat face 21*a*, 22*a* facing towards the flow tube 12. Upon assembly, as shown in FIG. 2, the transducers 21, 22 are located in respective recesses 23, 24 in the acoustic couplers 14, 15 with their flat faces 21*a*, 22*a* in intimate contact with the flat faces of the recesses 23, 24. Additional acoustic coupling material, such as grease or acoustic mastic may be used to ensure good acoustic coupling between the transducers and the acoustic coupler.

The piezoelectric acoustic transducers 21, 22 are permanently fixed to the body 19 of the flowmeter 11, and the connection between the transducers 21, 22 and the acoustic couplers 14, 15 is releasable. This is achieved, in this embodiment, by pressure members 25, 26, held in place by straps, clamps or other means (not shown). In this embodiment the acoustic couplers 14, 15 are held in firm engagement with the transducers 21, 22, preferably with a reactive force between them such as would be achieved by locating the couplers 14, 15 in place with a spring clip or screw connection, clamp or the like. As mentioned above, further acoustic coupling material (not shown) may be provided between the transducers and the couplers 14, 15 to fill any air gaps and ensure a good acoustic connection between them. This material may be a mastic or plastic material capable of moulding itself to the shape of the mating surfaces when they are brought together.

The dimensions of the transducers 21, 22 are chosen in such a way as to achieve an appropriate resonant frequency when excited by an electric signal. The size of the piezoelectric transducer is selected to ensure that a sufficient contact area with the faces 23, 24 of the couplers 14, 15 is achieved.

Because the flow tube 12 having its associated acoustic couplers 14, 15 is interchangeable with other such flow tubes it is important that appropriate calibration is undertaken in order to ensure accurate readings. The flow tube 12 may be subject to a preliminary calibration step during manufacture, and the information concerning the calibration recorded, for example on a barcode 27 a sleeve 30 carried by on one of the couplers, in the example illustrated in FIGS. 1 to 3 the coupler 14. Alternatively, of course, the barcode 27 may be printed directly on to the tube 13 itself. This barcode comprises information relating to the serial number of the flow tube, the date of calibration of the flow tube and the calibration constants which are specific to that flow tube. A barcode reader 28, including a camera or other such photo sensitive device, is located on the body 19 of the flowmeter 11, and is able to read the barcode 27 on the coupler 14 during installation of the interchangeable flow tube 12. For this purpose it is necessary that the barcode 27 be displaced with respect to the reader 28, for which purpose the sleeve 30 of the coupler 14 may be so formed that relative turning of this can achieve an appropriate relative displacement between the barcode 27 and the reader 28. On initialisation of the flow measurement process the barcode reader then reads the flowmeter batch data and the calibration factors which are then used in the subsequent flow measurement.

Figure 4:
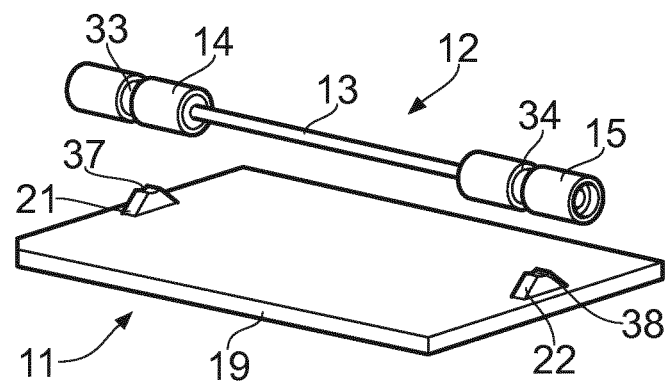
FIG. 4 is a schematic perspective view illustrating the major components of an alternative embodiment of the invention.

Referring now to FIG. 4, it will be understood that the flowmeter of the invention is a transit-time differential ultrasonic flowmeter in which the piezoelectric transducers act both to transmit and to receive acoustic signals to determine the flow rate of a fluid flowing in the tube by using the transit time difference between signals transmitted in opposite directions along the length of the flow tube. Methods for measuring time difference and converting these to a flow velocity or flow volume are well known to those skilled in the art.

FIG. 4 illustrates an alternative embodiment having a different configuration. It will be noted that, throughout the drawings, and in the different embodiments, those components which are the same as, similar to, or fulfil the same function as, corresponding components described in relation to FIGS. 1 to 3, have been identified with the same reference numerals. In the embodiment of FIG. 4 the flow tube 12 differs from that in the embodiment of FIGS. 1 to 3 in that the acoustic couplers 14, 15 at each end of the central tube 13 have circumferential grooves 33, 34 rather than the flat recesses of the couplers 14, 15 in FIGS. 1 to 3.

The piezoelectric transducers 21, 22 also have concavely curved part-cylindrical surfaces 37, 38 and are fixedly secured to the body 19 of the flowmeter 11. When the disposable flow tube 12 is fitted in place the concavely curved surfaces 37, 38 of the transducers 21, 22 engage in the circumferential grooves 33, 34 of the acoustic couplers 14, 15. The transducers 21, 22 are simply held in place by suitable releasable connectors (not shown) which may be for example, spring clips, surrounding straps or other clamping means capable of providing suitable contact pressure between the transducers 21, 22 and the acoustic couplers 14,15. This embodiment, like the embodiment of FIGS. 1 to 3, is economical to produce since the disposable flow tube 12 is simple and comprises just the central metal tube 13 and the acoustic couplers 14, 15, each of which has a suitable conformation at the outer ends to receive a connecting duct or pipe of the external circuit (not shown) into which the flowmeter is connected in use.

Figure 5:
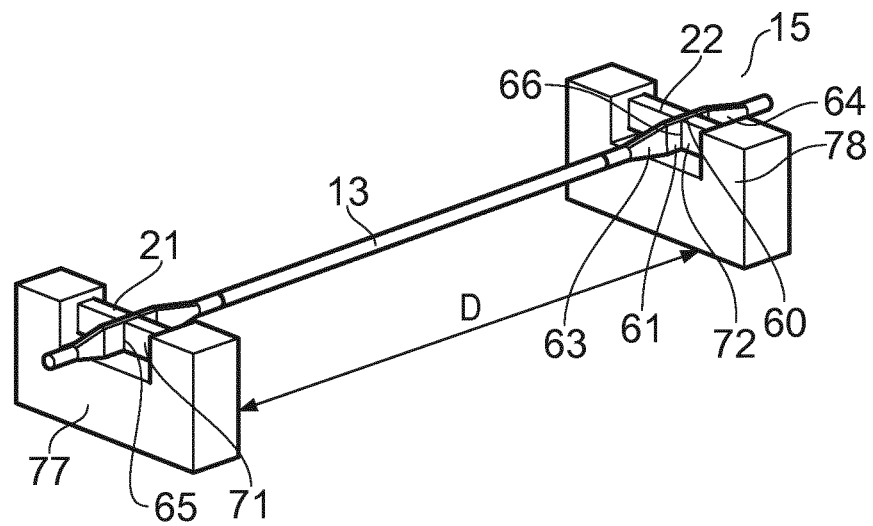
FIG. 5 is a perspective view of a further alternative embodiment.
Figure 6:
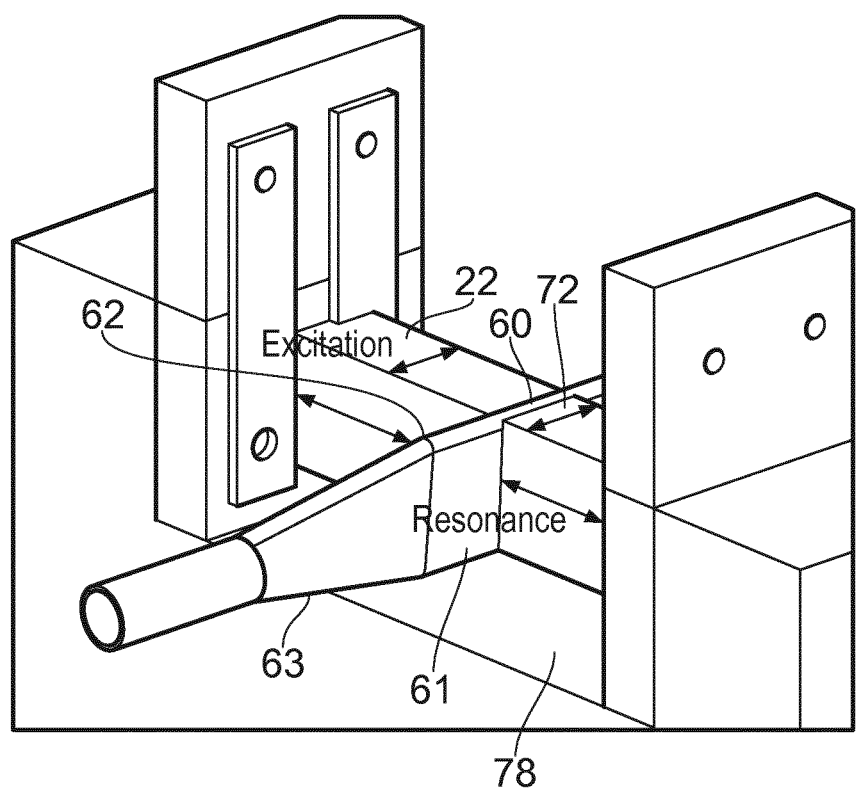
FIG. 6 is an enlarged detail of part of FIG. 5.

A further alternative embodiment is illustrated in FIGS. 5 and 6. In this embodiment the acoustic couplers 14, 15 at each end of the central tube 13 of the disposable flow tube 12 have a different cross sectional shape from that of the flow tube 13 itself. In detail, considering the acoustic coupler 15, this comprises a flat rectangular central section 60 bounded by two opposite flat faces 61, 62 and joined to the circular section part of the tube 13 by flattened conical or tapering horn-like interconnection sections 63, 64 having a circular cross section at one end where they join the circular cross-section part of the flow tube 13 and a generally rectangular cross section where they join the flattened rectangular coupler 15.

The acoustic couplers 14, 15 fit snugly into respective slots 65, 66 between the piezoelectric transducers 21, 22 and respective reaction blocks 71, 72 made of a material such as to enhance the resonance of the transducers 21, 22. In this embodiment the transducers 21, 22 are again parallelepiped in shape. As will be appreciated, parallelepiped transducers such as the transducers 21, 22 illustrated in FIG. 6 of the drawings, have three resonant frequencies corresponding to resonances of the structure between the main faces (thickness mode), along its length (length mode) and across its width (width mode). By exciting a piezoelectric acoustic transducer across its thickness at a frequency corresponding to the length resonance an ultrasonic wave at a suitable frequency is launched into the fluid in the flow tube. The thickness of the material (being a suitable polymer) of which the acoustic coupler 14, 15 is made is chosen such that matching of the impedance between the fluid intended to pass through the tube 13 and the piezoelectric material of the transducers 21, 22 is optimised. The thickness of the acoustic coupler (that is the dimension between the internal bore 17 and outer cylindrical surface can be determined by reference to the intended frequency of the acoustic wave and the speed of sound in the material from which the coupler is made. Although described as being energised in the length mode, it is to be understood that the resonant frequency in any of the modes may be used to generate a plane wave in the flow tube 13 providing the frequency of energisation is selected appropriately. This allows a greater relative phase shift of the higher frequency signal (for a given tube length) to give a better resolution at the lower flow rate. In this way the operating range of the flowmeter 11 can be extended.

In the embodiment of FIG. 6 the transducers 21, 22 are shown to be excited in the thickness mode to resonate in the length mode.

The transducers 21, 22 in the embodiment of FIGS. 5 and 6 are carried on respective transducer mounts 77, 78 which are themselves carried by the body 19 (not shown in FIG. 6) at a determined spacing D which is known for a given transducer body. By utilising flattened rectangular coupler bodies 14, 15, however, small variations in the length of the disposable flow tube 13 can be easily accommodated providing suitable measures are taken to calibrate the instrument once the flow tube has been fitted.

There may be circumstances where the available distance for separation of the transducers 21, 22 equivalent to the distance D in FIG. 5, is less than the required length of the flow tube 13, in which case an alternative embodiment (not shown) may be utilised in which the central metal tubular part 13 of the flow tube 12 is bent into a curve, s-shape or even formed into a circle so that its ends joining the acoustic couplers 14, 15 are relatively closely spaced whereas the path length within the flow tube is maintained.

FIG. 7 illustrates in block diagram form the major components of a flowmeter as described, with two spaced transducers 21, 22 which can be coupled acoustically to a flow tube 13. In this figure the transducers 21, 22 are shown in direct contact with the flow tube 13, with perhaps a suitable acoustic coupling material in place to fill any possible air gaps. Acoustic grease or a suitable mastic composition may be used for this purpose. The energising signal at the selected frequency is generated by an oscillator 80 under the control of a control circuit 81, and its output signal is supplied on line 83 to a routing switch 84 which has two outputs on lines 85, 86 to transducers 21, 22 respectively. The switch 84 directs the energising signal alternatively to one transducer or the other. While one transducer is energised to transmit the other acts as a sensor, producing an electric output signal in response to the acoustic signal arriving along the flow tube 13 from the other transducer. This electric signal is passed from the transducers 21, 22 along lines 87, 88 respectively to a receiver circuit 89 which passes an output signal on line 90 to a comparison circuit 91 which also receives, on line 92 the oscillator output signal fed on line 83 to switch D4.

The comparison circuit 91, detects the phase difference between the transmitted and received signals in each of the two directions, that is from transducer 21 to transducer 22, and from transducer 22 to transducer 21. This phase difference results from the flow rate of the fluid in the flow tube 13 and this provides an indication of the magnitude of the flow rate.

In one exemplary embodiment a flow tube of 9 mm bore was found to perform satisfactorily with a 250 kHz excitation, and it is considered that it would be possible to make embodiments having a 1 mm bore flow tube and excite the transducers at about 1.5 kHz.

The invention claimed is:

1. A transit time differential acoustic flowmeter having acoustic transducers configured to acoustically couple to a fluid, wherein the fluid flows through a flow tube and through an internal passage of respective acoustic couplers connected to ends of the flow tube, and further wherein the flow tube is demountable from the flowmeter so as to enable the flow tube to be disconnected from an external circuit delivering and carrying away the fluid the flow of which is to be detected.

2. An acoustic flowmeter as claimed in claim 1, in which the acoustic transducers are mounted on the body of the flowmeter and a releasable connection is provided between the acoustic transducers and the acoustic couplers that acoustically couple the flow tube and the acoustic transducers.

3. An acoustic flowmeter as claimed in claim 1, in which the acoustic transducers are mounted on the body of the flowmeter and a releasable connection is provided between the flow tube and the acoustic couplers that acoustically couple the flow tube and the acoustic transducers.

4. An acoustic flowmeter as claimed in claim 1, in which the acoustic transducers have a parallelepiped shape with a substantially flat face in contact with the acoustic couplers that acoustically couple the flow tube and the acoustic transducers.

5. An acoustic flowmeter as claimed in claim 4, in which the acoustic transducers are connected so as to be stimulated to oscillate lengthwise thereof (length mode).

6. An acoustic flowmeter as claimed in claim 4, in which the acoustic transducers are connected so as to be stimulated to oscillate in the direction of the width of the parallelepiped (width mode).

7. An acoustic flowmeter as claimed in claim 4, in which the acoustic transducers are connected in such a way as to be stimulated to oscillate within the thickness of the material (thickness mode).

8. An acoustic flowmeter as claimed in claim 1, in which the acoustic transducers each have a concavely curved face in contact with the acoustic couplers that acoustically couple the flow tube and the acoustic transducers.

9. An acoustic flowmeter as claimed in claim 8, in which the transducers have an arcuate shape.

10. An acoustic flowmeter as claimed in claim 8, in which driving circuitry is connected to the transducers in such a way as to stimulate its oscillation in a radial mode.

11. An acoustic flowmeter as claimed in claim 8, in which driving circuitry is connected to the transducers in such a way as to stimulate its oscillation in a paraxial or thickness mode.

12. An acoustic flowmeter as claimed in claim 1, in which the frequency of operation of a driving circuit to stimulate oscillation of the acoustic transducers is determined in relation to the dimensions of the flow tube in such a way that, in use, a substantially planar acoustic wave is propagated through the fluid along the length of the tube.

13. An acoustic flowmeter as claimed in claim 1, in which the flow tube is substantially straight along its entire length between the acoustic couplers that acoustically couple the flow tube and the acoustic transducers, with no singularities between the acoustic couplers.

14. An acoustic transducer as claimed in claim 1, in which the flow tube has an intermediate section of different transverse dimension from the ends thereof.

15. An acoustic flowmeter as claimed in claim 1, in which the acoustic couplers that acoustically couple the flow tube and the acoustic transducers and the acoustic transducers are held in contact with one another by connection means operable to apply a force to the interface between the transducer and the coupling.

16. An acoustic flowmeter as claimed in claim 1, in which driving circuitry is connected to the acoustic transducers to deliver energising signals thereto alternatively.

17. An acoustic flowmeter as claimed in claim 14, in which detection circuitry to process electrical signals generated by the acoustic transducers is connected to the transducers.

18. An acoustic flowmeter as claimed in claim 1, further including driving circuitry to deliver energising signals to the transducers to selectively stimulate the acoustic transducers so as to oscillate at one of a number of different frequencies whereby to extend the range of flow rates measurable by the flowmeter.

19. A flow tube for an acoustic flowmeter, comprising a conduit having a flow passage therethrough for a fluid the flow rate of which is to be measured, an acoustic coupler at each end of the flow tube, wherein the acoustic couplers and the flow tube form a passage for the fluid to flow through, and means for retaining the flow tube in acoustic contact with one more acoustic transducers through the said acoustic coupling means.

20. An acoustic flowmeter comprising a flowmeter body having driving and detection circuitry, an elongate flow tube, two acoustic transducers and acoustic couplers at each end of the flow tube for transferring acoustic energy between the transducers and a fluid within the flow tube, wherein the acoustic couplers and the flow tube form a passage for the fluid to flow through, and further wherein the flow tube is separable from the acoustic transducers and releasably mounted on the body of the flowmeter so as to be readily removable for replacement by a like such flow tube.

21. The acoustic flowmeter of claim 20, wherein the passage formed by the acoustic couplers and the flow tube has a single diameter throughout.

\* \* \* \* \*